United States Patent [19]

Carella et al.

[11] 4,065,178

[45] Dec. 27, 1977

[54] EASY ENTER SEAT ASSEMBLY

[75] Inventors: Richard F. Carella, Mount Clemens, Mich.; Thomas W. Perry, South Bend, Ind.

[73] Assignee: General Motors Corporation, Detroit, Mich.

[21] Appl. No.: 779,085

[22] Filed: Mar. 18, 1977

[51] Int. Cl.² .............................................. B60N 1/02
[52] U.S. Cl. ..................................... 297/341; 248/430
[58] Field of Search ....................... 297/341, 378, 377; 5/44

[56] References Cited

U.S. PATENT DOCUMENTS

| 3,890,001 | 6/1975 | Turner | 297/341 |
|---|---|---|---|
| 3,973,799 | 8/1976 | Berg | 297/341 |
| 4,015,877 | 4/1977 | Button | 297/341 |

FOREIGN PATENT DOCUMENTS

| 1,445,820 | 8/1976 | United Kingdom | 297/341 |

Primary Examiner—Francis K. Zugel
Attorney, Agent, or Firm—K. H. MacLean, Jr.

[57] ABSTRACT

A vehicle seat assembly includes a seat back and seat cushion which is attached to one track of a dual track assembly to permit fore and aft movement along the second track whose ends are affixed to the vehicle floor. A seat adjustment positioner member is selectively located along the second track and is engaged at its forward side by stops attached to the seat cushion for limiting rearward movement of the seat cushion. The seat back is tiltably supported at both sides by arms which are attached at their lower ends to a shaft the ends of which engage the rear side of the adjustment positioner. Interconnective means between the seat back arms and the seat cushion causes forward movement of the seat cushion when the seat back is tilted in a forward direction, all without movement of the seat adjustment positioner which remains in place to relocate the seat cushion in its former position after the seat back is returned to its former position.

3 Claims, 6 Drawing Figures

EASY ENTER SEAT ASSEMBLY

This invention relates to a vehicle seat assembly, including a seat cushion which is forwardly movable from a position established by a seat adjuster mechanism as the seat back is tilted forward.

Mounting a vehicle seat assembly on generally horizontally disposed track means to permit fore and aft movement of the seat is well known. Providing a seat back which pivots forwardly with respect to the seat cushion is also known. Also known is a vehicle seat assembly in which forward tilting movement of the seat back produces forward movement of the seat cushion to facilitate entry to the rear seat. An arrangement for providing the aforementioned function is disclosed in U.S. Pat. No. 3,853,373 issued to Corbett and assigned to General Motors Corporation.

The subject application discloses an improved and greatly simplified seat assembly for mounting the seat back and seat cushion in a manner to provide the aforedescribed desirable function.

According to the present invention, a vehicle seat is provided which includes a seat cushion and a seat back. A dual track assembly supports the seat cushion and permits fore and aft adjustment of the seat. The track assembly includes a stationary rail portion and a movable rail portion on both sides of the seat attached, respectively, to the floor and to the seat cushion. The stationary portion has an elongated opening or slot extending in a fore and aft direction with respect to the vehicle. A seat adjustment mechanism includes a shaft extending laterally under the seat cushion and supported adjacent its end portions in the elongated slots in the spaced stationary tracks. Latch means affixed to the shaft engages detents on the stationary track to maintain a preset position of the shaft with respect to the ends of the elongated openings. A second shaft, rearward of the first, extends laterally with respect to the vehicle seat cushion. The end portions of the second shaft also extend into the elongated slots of the stationary track and are movable therein. The ends of the second shaft are attached to inboard and outboard seat back arms which extend downward from the seat back and permit the seat back to tilt forward about the axis of the second shaft.

The seat back arms have elongated apertures located therein near their mid portions which accept protruding shoulder bolts which are attached to the seat cushion. The shoulder bolts normally engage the upper end of the aperture to limit the rearward tilt of the seat back. As the seat back is tilted forward, the shoulder bolts move within the apertures while simultaneously urging the seat cushion forward to provide increased room at foot level for a passenger entering the rear seat area of the vehicle.

A seat adjuster handle or lever is provided to selectively rotate the first shaft and the affixed latch to an unlatch position from the detents so that the first shaft and seat cushion may be moved fore and aft in the elongated slots of the stationary tracks. Movement of the first shaft to a position intermediate the ends of the slot also permits the second shaft and its connected seat back arms to move forward thereagainst.

When the seat back is tilted forwardly, the second shaft rotates and slides rearwardly against the back portion or edge of the elongated slot. Simultaneously, the portions of the seat back arms defining the openings therein bear against the shoulder bolts to slide the seat cushion in a forward direction. While the seat cushion is moved forwardly, the first shaft and latch remain stationary and in the original selected position so that on return of the seat back and cushion the selected position will be reestablished. The forward position of the seat cushion is determined by the interaction between the second shaft, the rear end of the track's elongated slot, and the interconnection between the seat back arms and the seat cushion. Consequently, the limit of forward travel of the seat cushion is independent of the preselected position of the first shaft and position locating latch.

Thus, the invention provides a simple easy-enter vehicle seat construction which facilitates access to the rear seat area by forward movement of the seat cushion to a constant forward position by the forward tilting movement of the seat back.

IN THE DRAWINGS

Figure 1:
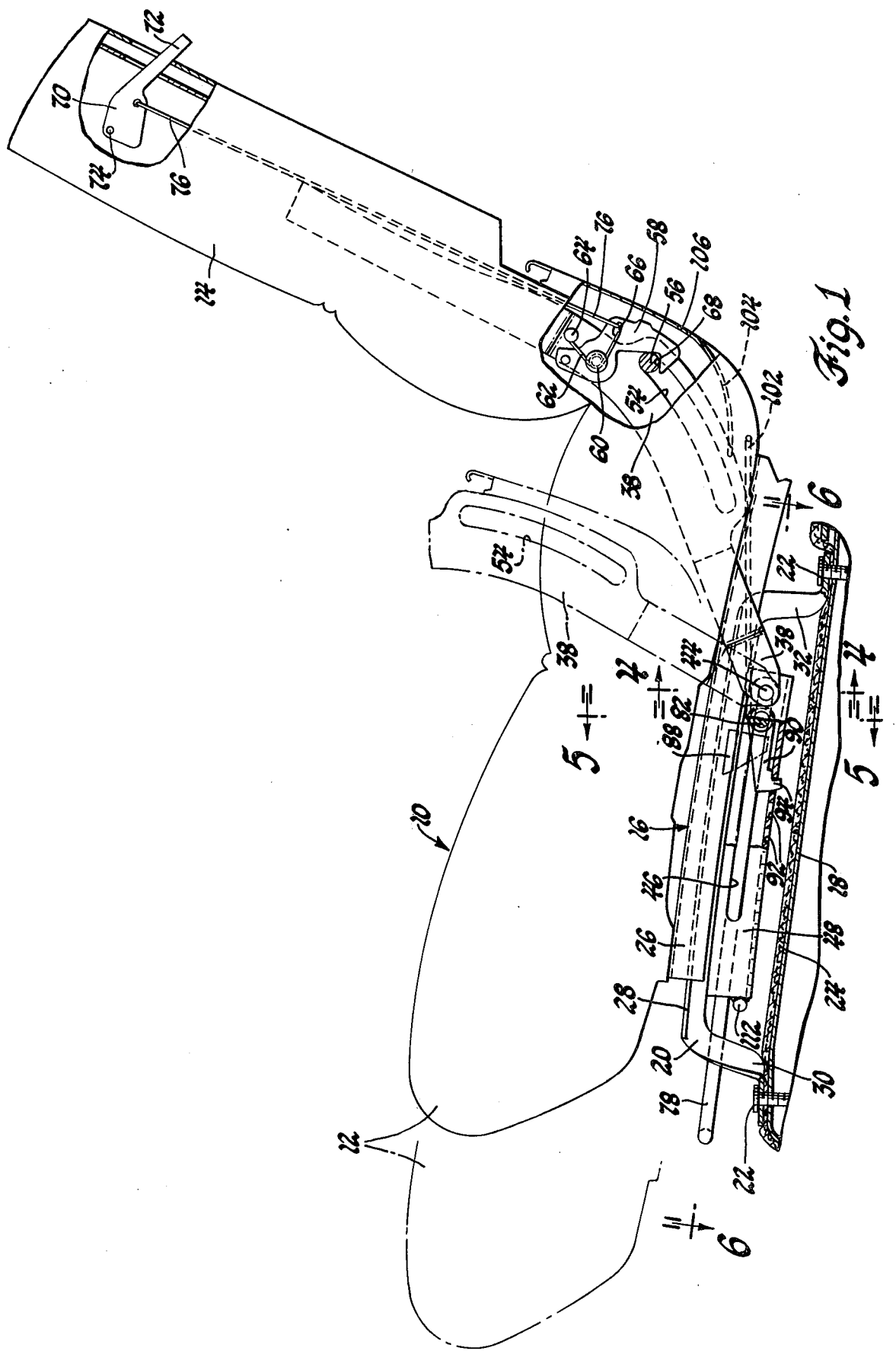
FIG. 1 is a side elevational view of a vehicle seat assembly selectively positioned in a fully rearward position.

Referring to FIG. 1, a vehicle seat assembly according to the invention is shown. The assembly is indicated generally as 10 and includes seat cushion 12 and a seat back 14. The seat cushion 12 is attached to member 16 oriented in a fore and aft direction with respect to the vehicle (on both sides of the seat but visible on only one side in FIG. 1). The seat is supported on elongated stationary members 20 which are in turn attached to floor 18 by fasteners 22 which extend through a carpet layer 24 and the floor 18.

Figure 4:
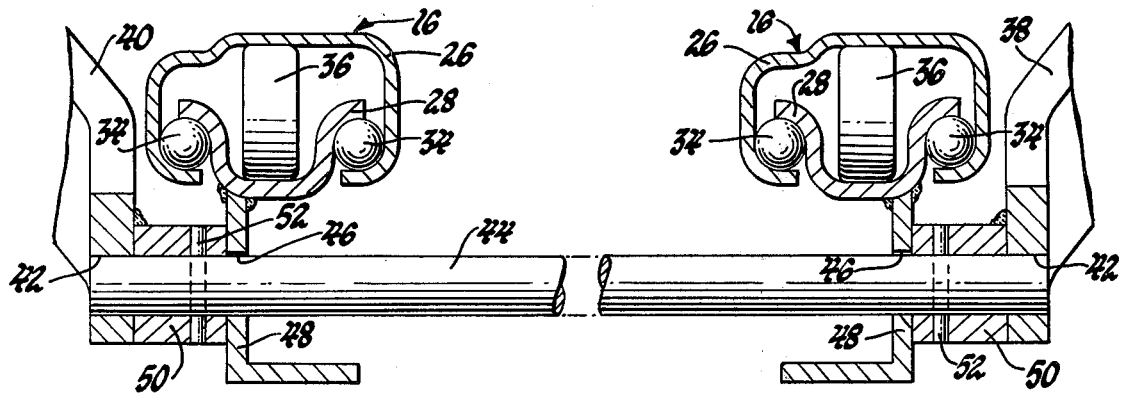
FIG. 4 is a sectional view through the seat support mechanism taken along section line 4—4 in FIG. 1 and looking in the direction of the arrows.
Figure 5:
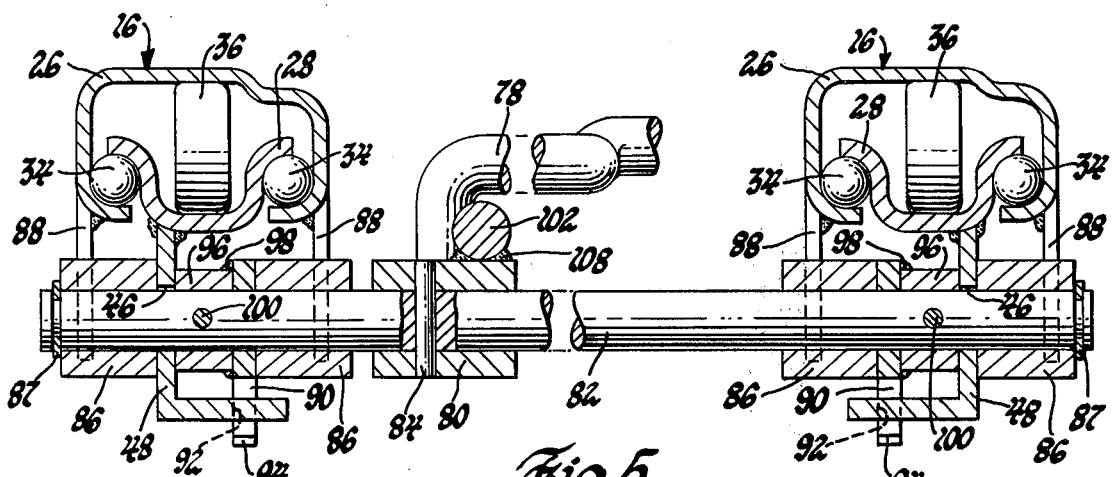
FIG. 5 is a sectional view through the seat support mechanism taken along section line 5—5 in FIG. 1 and looking in the direction of the arrows.
Figure 6:
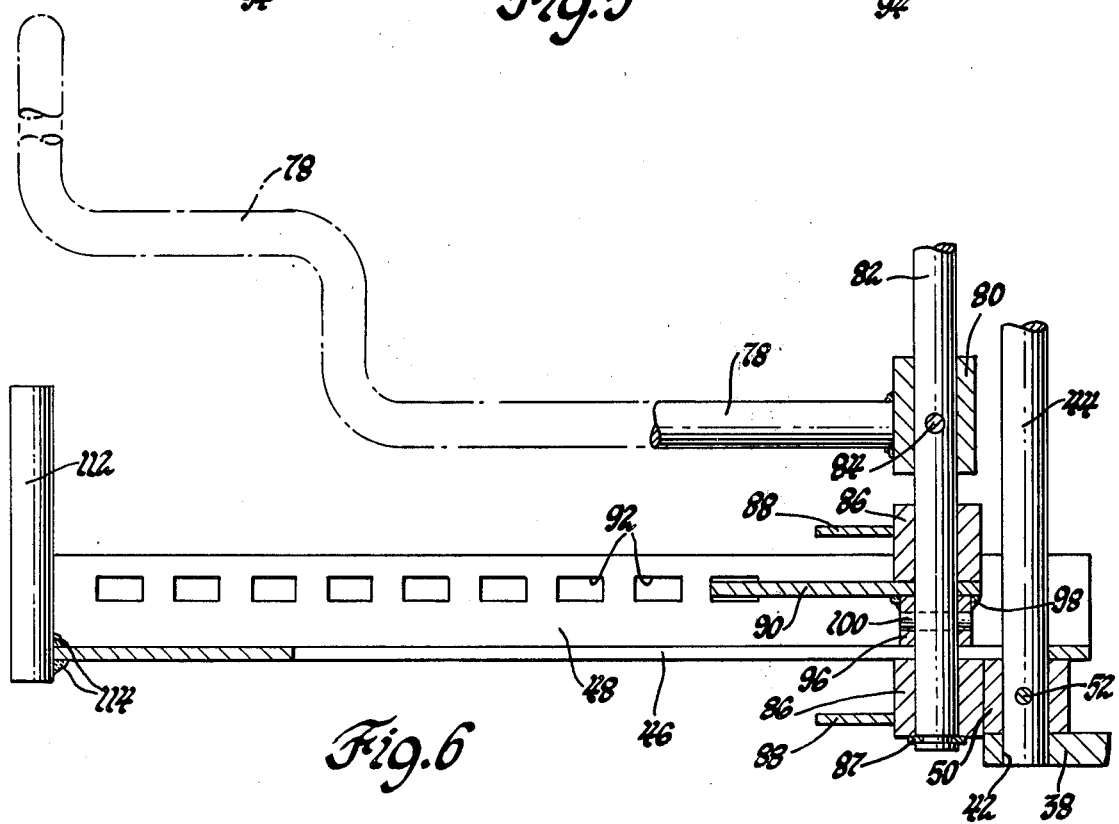
FIG. 6 is a section view of the seat support mechanism taken along section line 6—6 in FIG. 1 and looking in the direction of the arrows.

More particularly, the seat support arrangement is best shown in FIGS. 4–6. The members 16 include upper rail or track portions 26 and members 20 include lower rail or track portions 28. Members 20 are attached to the vehicle floor at forward and rearward end positions 30, 32 as seen in FIG. 1. A plurality of spherical members or balls 34 are seated between the upper track 26 and the lower track 28 to smoothly guide track 26 along track 28 as the seat slides in the fore and aft direction. In addition, load bearing rollers 36 between the upper and lower tracks 26, 28 smoothly transmit vertical forces resulting from the weight of the seat and an occupant to the lower tracks 28.

The seat back assembly 14 includes an outboard J-shaped support arm 38 and an inboard support arm 40. As seen in FIGS. 4 and 6, the arms 38, 40 include bores 42 at their lower end portions which engage the ends of a pivotal shaft 44. The shaft 44 extends laterally with respect to the vehicle seat cushion 12 between the outboard and the inboard track assemblies. Specifically, the end portions of shaft 44 project through elongated slots 46 in the depending portions or brackets 48. The seat back arms 38, 40 are fixedly attached to cylindrical members 50 located on either side of the depending brackets 48. As seen in FIG. 4 and FIG. 6, the members 50 are affixed to shaft 44 by pins 52 to prevent relative rotation therebetween. When the seat back 14 is tilted forward to the passenger entry position, indicated by phantom lines in FIG. 1, the arms 38 and 40 and shaft 44 rotate together.

As best revealed in FIG. 1, the outboard arm 38 has an elongated aperture 54 therein. The aperture 54 encircles a projection in the form of shoulder bolt 56 which is attached to the seat cushion 12. To prevent forward tilting of the seat back 14 by inertial forces, a seat back latch mechanism is utilized. It includes a pivotal latching member 58 attached to arm 38 by a bolt fastener 60. The ends of a spring 62 encircles fastener 60 and engages a projection 64 at one end and extends into an opening 66 in latch 58 at the other end. Spring 62 normally pivots the latching member 58 in a clockwise direction in FIG. 1. By this hook portion 68 of the latching member 58 is engaged with the shoulder bolt 56 to prevent forward tilting of the seat. To release the seat back for tilting, a projecting portion 72 of release lever 70 mounted on the seat back is moved upward about attachment point 74 which, through a rod connector 76, pivots the latch member 58 in a counterclockwise direction into an unlatched position.

Fore and aft adjustment of the seat assembly by the vehicle occupant can be accomplished by uplifting the end of a lever 78 which extends from underneath the forward edge of the seat cushion 12. The lever 78 is attached to a fitting 80 encircling a seat position locating shaft 82. The fitting 80 is affixed to shaft 82 by pin 84 to prevent relative rotation therebetween. The end portions of shaft 82 extend through slots 46 in the depending brackets 48. As seen in FIG. 5, spacer members 86 are located on either side of the vertical wall portion of brackets 48 and are held by retainers 87. Members 86 are located such that they are engaged by depending portions 88 from the upper track 26 forward of shaft 82, as shown in FIGS. 5 and 6. Portions 88 act as stops to limit rearward movement of the seat cushion 12.

Figure 2:
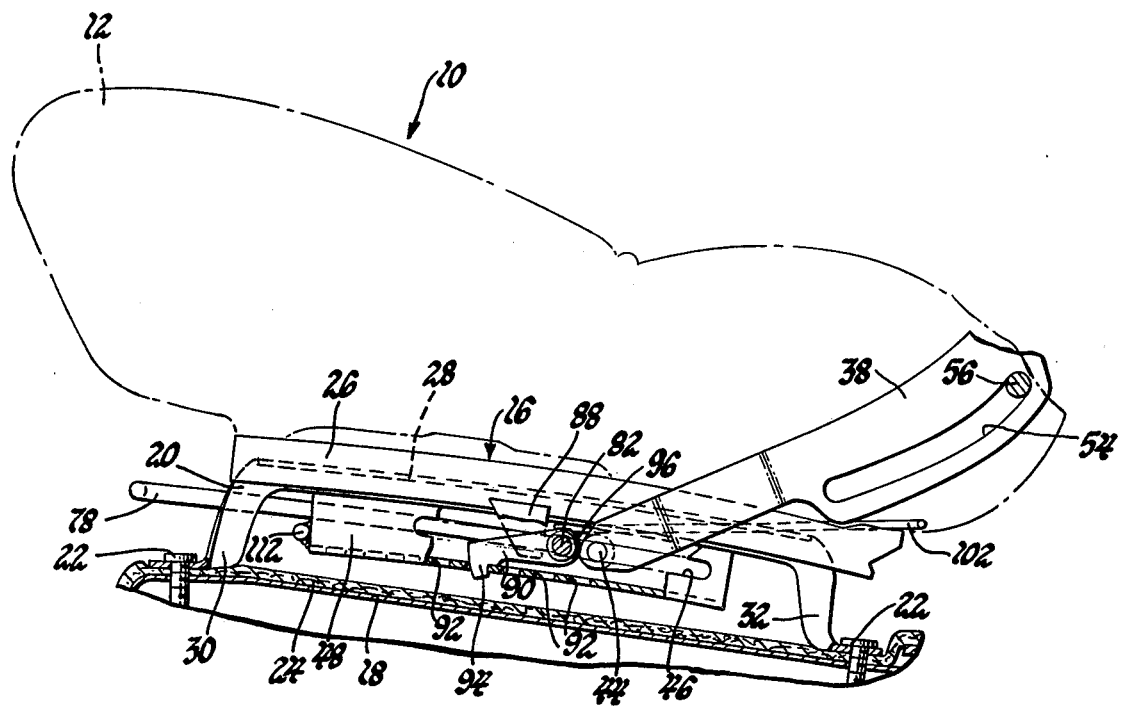
FIG. 2 is a partial view of the seat support mechanism shown in FIG. 1 but in an intermediate preselected position.

The ends of shaft 82 are selectively positioned in the direction of the slots 46 by engagement between a position latch arm 90 and detent apertures 92 in the bracket 48 as shown in FIG. 1. The arm 90 includes a downwardly directed hook end portion 94 which enters one of apertures 92 to position the shaft 82. The other end of arm 90 is affixed to a cylindrical flange 96 by a weld 98. In turn, the flange 96 is secured to shaft 82 by a pin 100 to prevent relative rotation between the flange 96 and shaft 82. Uplifting the forward end of the adjustment arm 78 rotates the shaft 82 to disengage the hook portion 94 from opening 92 so that the seat assembly 10 may be moved forwardly or rearwardly until a desirable seat position is selected. In FIG. 2, an intermediate position of the shaft 82 is illutrated. Once the desirable seat position is selected, the adjustment lever 78 rotates counterclockwise, which allows the hook portion 94 to enter an aperture 92.

In addition to lever 78 which permits the seat occupant to adjust the position of the seat, means are provided to enable a rear occupant of the vehicle to adjust the front seat. A rearwardly projecting adjustment lever 102 is provided for this purpose and is shown in FIGS. 1 and 5. Lever 102 terminates adjacent the rear edge of the seat cushion 12 and a portion 104 of the seat kick panel 106 extends inward and upward to provide a recess for engaging the end of lever 102 by hand or foot. As revealed in FIG. 5, the forward end of lever 102 is attached to the fitting 80 by a weld or braze 108. Thus, depression of the lever 102 causes rotation of the shaft 82 and unlatching of latch arm 90.

To avoid misunderstanding, it should be noted that the shaft 112, shown in FIGS. 1 and 6, which extends across the forward portion of the adjustment bracket 48 is simply a bracing member which is welded at location 114 to the bracket member 48. In addition, it may be desirable to provide a spring to bias lever 78 downward. The spring is not shown but may be a leaf type attached at an upper end to the forward part of the seat cushion 12 and extending rearward and downward into engagement at a free end with lever 78 to normally bias the lever 78 downward. The engagement between the leaf spring and the lever 78 may be a sliding engagement only, so that upon uplifting of lever 78, the spring is flexed and the spring end slides along the lever. Also, an elongated coil type tension spring may be advantageously employed between the forward portion of stationary track 28 and a rearward portion of the movable track 26. This biases the seat forward as the seat back is tilted.

Figure 3:
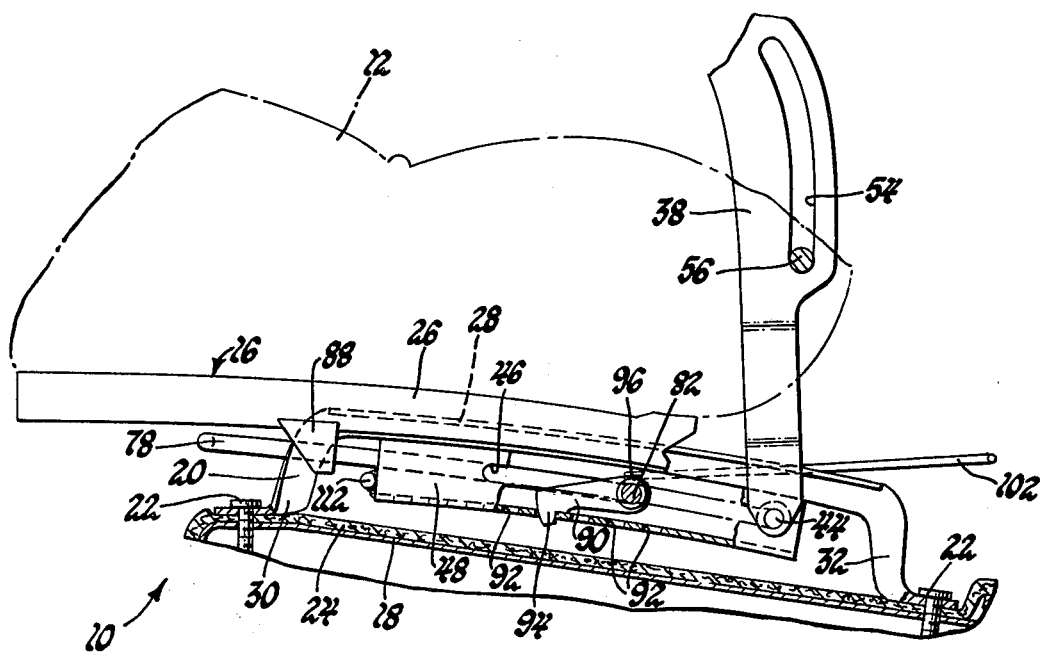
FIG. 3 is a view like FIG. 2 but with the seat back support arms tilted forward to the rear seat entry position.

The operation of the seat is as follows. Irrespective of where locater shaft 82 is positioned, forward tilting of the seat back produces pivotal movement of arms 38, 40 about the axis of shaft 44 while the shaft engages the rearward ends of slots 46. Unless locater shaft 44 is already at its extreme rearward location as in FIG. 1, the shaft 82 slides bodily rearward to the rear ends of slots 46. The movement of shaft 44 in the slots 46 is shown in FIGS. 2, 3. Pivoting of the arms 38, 40 causes shoulder bolts 56 to engage the rear edge portion of aperture 54 and to resultantly slide seat cushion 12 forward until shoulder bolts 56 engages the bottom end portions of apertures 54. Note that the forward travel of the seat cushion is determined by the interaction between bolts 56 and the slotted aperture 54 and the bearing relation between shaft 44 and the rear end of slots 46.

Rearward return of the seat assembly to the driving position is accomplished by rearward tilting of the seat back. Consequently, the shoulder bolts 58 move upward and rearward in apertures 54. Seat cushion 12 is thereby moved rearward with the arms 38, 40 and bolts 58. The rearward travel of the seat cushion is established by engagement of the depending portions 88 and spacers 86 on shaft 82. Simultaneously, arms 38, 40 and connected shaft 44 bear in a forward direction against the locater shaft 82 to establish a solid seat back support structure.

The features of the invention in which an exclusive property or privilege is claimed are defined as follows:

1. A vehicle seat including a cushion and a seat back, track means including spaced rail members attached to said seat cushion and corresponding rail members attached to the vehicle floor slidingly engageable together for movement of said seat cushion in a fore and aft direction with respect to the vehicle, said stationary rails being attached to the vehicle floor and having a vertical wall with elongated slots therein extending in a fore and aft and generally horizontal direction, seat locater means extending between said stationary rails with end portions within said elongated slots and provision for selectively fixing said end portions at desirable locations along said elongated slots corresponding to a desired fore and aft seat cushion position, arm members extending from said seat back and being pivotally mounted to said stationary rails rearward of said end portions of the seat locater means to permit forward tilting movement of the seat back, said pivotal mounts of the seat back arms having an axis extending through said elongated slots and slidable rearwardly within said elongated slots as said seat back is tilted forward, connecting means between said seat back arms and said seat cushion to produce forward movement of the cushion as the arms are pivoted in response to forward tilting of the seat back, said connecting means limiting the degree of forward tilt and sliding movement of the cushion to a constant forward location irrespective of the position of said seat locater means, stop means extending from said slidable seat cushion and attached rail forwardly of the seat locater means and engageable therewith upon rearward return movement of the seat cushion to relocate said cushion in its preselected position along said stationary rails when the seat back is returned to its drive position.

2. A vehicle seat assembly including a cushion and a seat back, track means including a spaced rail member attached to said seat cushion and corresponding rail members attached to the vehicle floor slidably engageable together for movement of said seat cushion in a fore and aft direction with respect to this vehicle, said stationary rails being attached to the vehicle floor and having a vertical wall with elongated slots therein extending in a fore and aft and generally horizontal direction, seat locater means extending between said stationary rails including a shaft with end portions within said elongated slots and provision for selectively fixing said end portions at desirable locations along said elongated slots corresponding to a desired fore and aft seat cushion position, a second shaft rearward of said first shaft with its end portions extending into said elongated slots; arm members extending from said seat back and being affixed to the ends of said second shaft for rotation together as the seat back is tilted forwardly, said second shaft being slidable in a rearward direction within said elongated slots to permit the pivotal axis of the seat back arms to shift adjacent to the aft ends of the elongated slots as said seat back is tilted forward, connecting means between said seat back arms and said seat cushion to produce forward movement of the cushion as the arms are pivoted in response to forward tilting of the seat back, said connecting means limiting the degree of forward tilt and sliding movement of the cushion to a constant position irrespective of the setting of said seat locater means, stop means extending from said seat cushion and attached rail portion forwardly of the first shaft and engageable therewith upon rearward return movement of the seat cushion to relocate said cushion in its preselected position along said stationary rails when the seat back is returned to its drive position.

3. A vehicle seat including a cushion and a seat back, track means including spaced rail members attached to said seat cushion and corresponding rail members attached to the vehicle floor slidably engageable together for movement of said seat cushion in a fore and aft direction with respect to the vehicle, said stationary rails being attached to the vehicle floor and having a vertical wall with elongated slots therein extending in a fore and aft and a generally horizontal direction, a seat locater means extending between said stationary rails and including a shaft with end portions within said elongated slots and with provision for selectively fixing said end portions at desirable locations along said elongated slots corresponding to a desired fore and aft seat cushion position, manually operable means for rotating said seat locater shaft and disengaging said fixing provision to permit a seat occupant to move the seat cushion and seat locater means to a desirable position along said slots, a second shaft located to the rear of said first shaft and with its end portions extending into said elongated slots, arm members extending from said seat back and being affixed to said end members of said second shaft to permit simultaneous forward tilted movement of the seat back and rotation of said second shaft, said second shaft being rearwardly slidable within said elongated slots to permit the pivotal axis of the seat back and arms to shift rearward adjacent to the aft ends of the elongated slots as said seat back is tilted forward, connecting means between said seat back arms and said seat cushion to produce forward movement of the cushion as the arms are pivoted in response to forward tilting of the seat back, said connecting means including elongated openings in said arms and a projecting member attached to said seat cushion engaging said arms and movable from one end position to a second end position as the seat back is tilted from its rearward drive position to a forward entry position whereby the degree of tilting of the seatback is limited by engagement between the seat cushion mounted projection and the second end of the opening depending stop means extending from said seat cushion and attached rail portion at a location forward of the first shaft and engageable therewith on rearward return movement of the seat cushion as said seat back is tilted rearwardly thereby relocating said cushion in its selected position along said stationary rails as determined by the location of said first shaft.

* * * * *